United States Patent
Kunnas et al.

(10) Patent No.: US 9,521,900 B2
(45) Date of Patent: Dec. 20, 2016

(54) CAR SNOW BRUSH AND MANUFACTURING METHOD

(71) Applicant: Fiskars Garden Oy Ab, Billnäs (FI)

(72) Inventors: Kari Kunnas, Rekijoki (FI); Petteri Masalin, Helsinki (FI); Teemu Sandelin, Helsinki (FI); Mika Sokka, Tuusula (FI)

(73) Assignee: Fiskars Garden Oy Ab, Billnäs (FI)

( * ) Notice: Subject to any disclaimer, the term of this patent is extended or adjusted under 35 U.S.C. 154(b) by 0 days.

(21) Appl. No.: 14/885,782

(22) Filed: Oct. 16, 2015

(65) Prior Publication Data

US 2016/0120299 A1 May 5, 2016

(30) Foreign Application Priority Data

Oct. 30, 2014 (EP) .................................... 14190985

(51) Int. Cl.
| | | |
|---|---|---|
| A46B 17/08 | (2006.01) | |
| A46B 3/04 | (2006.01) | |
| A46B 5/02 | (2006.01) | |
| A46B 9/02 | (2006.01) | |
| B25G 1/10 | (2006.01) | |
| A46B 3/00 | (2006.01) | |
| A46B 15/00 | (2006.01) | |
| B60S 3/04 | (2006.01) | |

(52) U.S. Cl.
CPC ............... *A46B 17/08* (2013.01); *A46B 3/005* (2013.01); *A46B 3/04* (2013.01); *A46B 5/02* (2013.01); *A46B 9/025* (2013.01); *A46B 15/0081* (2013.01); *B25G 1/102* (2013.01); *A46B 2200/3046* (2013.01); *B60S 3/045* (2013.01)

(58) Field of Classification Search
CPC ........... A46B 17/08; A46B 3/04; A46B 9/025; A46B 5/02; A46B 3/08; A46B 9/005; A46B 2200/304; B25G 1/1026; B60S 3/045
See application file for complete search history.

(56) References Cited

U.S. PATENT DOCUMENTS 4,939,807 A * 7/1990 Hencz ..................... A47L 1/06
15/105
9,221,432 B2 * 12/2015 Blouin ..................... A46B 3/08

FOREIGN PATENT DOCUMENTS

| CN | 202160889 | | 3/2012 |
| CN | 203435877 U | * | 2/2014 |
| DE | 20201205196 U1 | | 6/2012 |
| EP | 0383594 A2 | | 8/1990 |
| EP | 2740387 A1 | | 6/2014 |

OTHER PUBLICATIONS

European Search Report for Application No. 14190985, 7 pages (Apr. 17, 2015).

(Continued)

*Primary Examiner* — Shay Karls
(74) *Attorney, Agent, or Firm* — Foley & Lardner LLP

(57) ABSTRACT

A car snow brush includes an elongated handle with a gripping area, and bristles protruding from the elongated handle. The bristles are in the form of elongated and flat strips, which are manufactured of a plastic material, and are arranged in at least two rows such that inner larger side surfaces of the strips in one row face inner larger side surfaces of the strips in another row. The rows are separated from each other by a gap which is larger than the thickness of the strips.

9 Claims, 2 Drawing Sheets

(56) References Cited

OTHER PUBLICATIONS

English-language machine translation of DE 20201205196 U1, Febu Horst Fey E.K. (Jun. 21, 2012).
English-language machine translation of CN 202160889, Maojiang, RAN (Mar. 14, 2012).

* cited by examiner

CAR SNOW BRUSH AND MANUFACTURING METHOD

CROSS-REFERENCE TO RELATED APPLICATIONS

This application claims the benefit of and priority to European Application No. 14190985.3, filed Oct. 30, 2014, all of which is incorporated by reference herein in its entirety.

BACKGROUND OF THE INVENTION

1. Field of the Invention

This invention relates to a car snow brush to be used for brushing away snow from a car.

2. Description of Prior Art

Previously there is known a car snow brush with an elongated handle having a gripping area. The handle of this known snow brush comprises a plurality of holes. Each hole is filled with a bundle of yarns functioning as bristles.

A problem with this known car snow brush is that material such as snow or dirt may accumulate between the yarns, from where it is difficult to remove. Due to this the use of the snow brush becomes difficult and it is even possible that the dirt accumulated in the yarn bundles scratches the car. Also, very often the thin bristles get bent and tangled after periods of use increasing the dirt accumulation even further and decreasing the appearance and appeal of the brush.

SUMMARY OF THE INVENTION

An object is to solve the above mentioned drawback and to provide a car snow brush with improved properties and a manufacturing method for producing such a car snow brush. This and other objects are achieved with the car snow brush according to independent claim 1 and with the method according to independent claim 8.

The use of bristles consisting of elongated and flat strips which are manufactured of a plastic material makes it possible to obtain a car snow brush which can more efficiently than previously be used for removing snow from a car without a risk of scratching the surface of the car.

Preferred embodiments are disclosed in the dependent claims.

BRIEF DESCRIPTION OF DRAWINGS

In the following the present invention will be described in closer detail by way of example and with reference to the attached drawings, in which.

DESCRIPTION OF AT LEAST ONE EMBODIMENT

Figure 1:
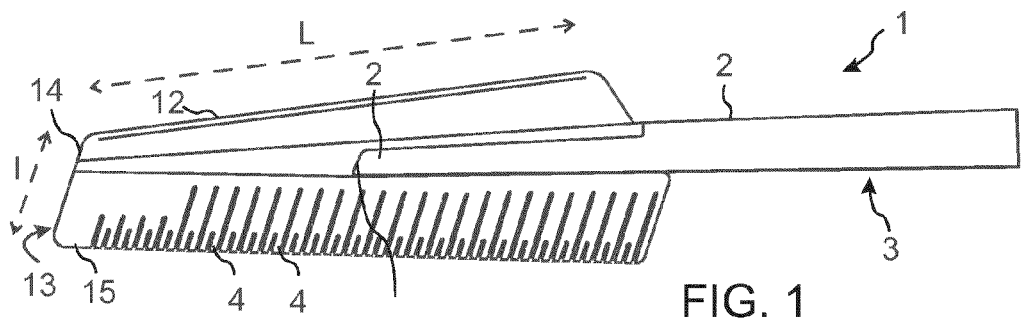
FIGS. 1 and 2 illustrate a first embodiment of a car snow brush.
Figure 2:
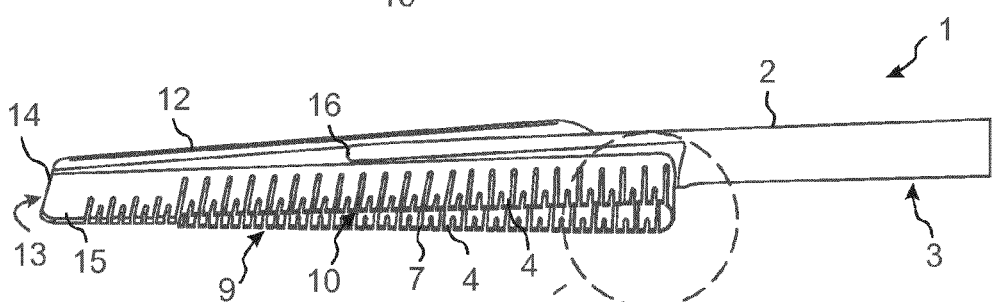

FIGS. 1 and 2 illustrate a first embodiment of a car snow brush 1. The car snow brush 1 has an elongated handle 2 with a gripping area 3 at which a user grips the car snow brush during use. The bristles are implemented as elongated and flat strips 4, which are manufactured of a soft plastic material, such as of TPE (Thermoplastic Elastomer), for instance. The tips of the flat strips can be slit to increase compliance to surface, as illustrated in the Figures.

As can be seen from the figures, the strips have larger side surfaces 5, 8 and smaller end surfaces 6. The strips 4 are aligned in at least one row such that the smaller end surfaces 6 of the strips face smaller end surfaces 6 of adjacent strips 4. In this way a row of strips is created that has a relatively large side surface 5, 8 area which comes into contact with snow while the car snow brush is used. The relatively small gaps 7 between the strips 4 improve the bending properties of the strips and give flexibility to the car snow brush to adapt to different surface features of the car.

In the illustrated example of FIGS. 1 and 2 the car snow brush 1 does not have only one row of strips, but instead the strips 4 are arranged in at least two rows, such that the inner larger side surfaces 5 of the strips in the first row 9 face inner larger side surfaces of the second row 10. The strips 4 of the first row 9 and the second row 10 are preferably slightly overlapping each other, such that the gaps 7 between the strips in the first row 9 are covered by the inner larger side surfaces of the strips in the second row and vice versa. In this way it can be avoided that snow passes between the gaps 7 of both rows 9, 10 when the brush is during use moved sideways.

FIG. 2 illustrates the car snow brush partially from below. As best seen in the encircled partial enlargement, the two rows 9 and 10 of strips 4 are separated from each other by a gap 11 which is larger than the thickness d of the strips 4. Additionally, the two rows 9 and 10 are arranged in a V configuration, where the distance D between the rows 9, 10 is larger closer to the gripping area 3 than in the opposite end of the elongated handle 2. Instead of having the two rows 9 and 10 in a V configuration as illustrated by way of example in the figures, these rows may be parallel. In the illustrated example the thickness d of the strips 4 may be about 2 mm, for instance. The gap 11 may be dimensioned such that the distance D between the rows 9 and 10 is about 10-12 mm at the end of the gap 11 which is closest to the gripping area 3 and about 4 mm at the end of the gap 11 which is located furthers away from the gripping area 3.

As illustrated in the figures, the strips 4 protrude from the car snow brush in a first direction, approximately in the radial direction outwards from the elongated handle 2. A scraper 12 protrudes from the car snow brush in a second direction, approximately in the radial direction outwards from the elongated handle 2. The second direction is generally opposite to the first direction such that the back side of the car snow brush 1 is provided with a scraper 12 which can be used for wiping of moist from car windows, for instance. The material of the scraper 12 may be the same as used for the strips 4, and the thickness of the scraper 12 at the outer edge facing away from the strips 4 may be about 0.7-2 mm, for instance.

In FIGS. 1 and 2 the outermost tip of the car snow brush 1 which is located as far away from the gripping area 3 as possible comprises a blade 13 with an outer edge 14 facing away from the gripping area 3 of the handle 2. The blade 13 may be stiffer than the strips 4. In the illustrated example a plate 15 arranged as an extension of the rows 9, 10 of strips 4 and the part of the scraper 12 located as far away from the gripping area 3 as possible together form the blade 13. The plate may be manufactured of the same material as the strips 4 and it may have a thickness of about 4 mm, for instance. The length l of the outer edge 14 of the blade 13 may be longer than the length L of an outer edge of the scraper 12 which faces away from strips 4. In praxis the relatively stiff blade 13 may be used to dig out snow from a groove, for instance. Cars typically have a small groove located at the interface between the lower part of the windshield and the front hood of the car. This groove often becomes filled with snow, which can be removed by the blade 13 of the illustrated car snow brush.

The blade 13, the scraper 12 and the strips 4 may be implemented as one single part manufactured of a plastic material. An end of the elongated handle 2 is attached to this single part comprising the blade, the scraper and the strips. There are many ways to implement such an attachment. One alternative is that the part comprising the blade, the scraper and the strips has a cavity or pocket into which an end of the elongated handle protrudes in order to attach the blade 13, the scraper 12 and the strips 4 to the handle 2. In FIGS. 1 and 2 the location of the opening 16 of this pocket or cavity is visible and the handle 2 may extend from the opening 16 of this cavity practically all the way to the blade 13, or alternatively, it may extend only a slight distance into the pocket of the single part comprising the blade, scraper and the strips.

The elongated handle 2 may be implemented as a plastic tube. In FIGS. 1 and 2 the right end of the handle 2, which is located as far away from the blade 13 as possible, may be provided with an ice scraper. Such an ice scraper is at its simplest implemented as a piece of stiff plastic material which has a stiff scraping edge facing away from the handle 2, though also other implementations are possible. The ice scraper may be an integrated part of the car snow brush, or alternatively, the ice scraper may be detachably attached to the handle 2 of the car snow brush.

Figure 3:
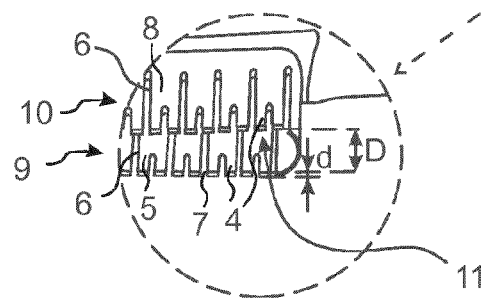
FIGS. 3 and 4 illustrate a second embodiment of a car snow brush.
Figure 3:
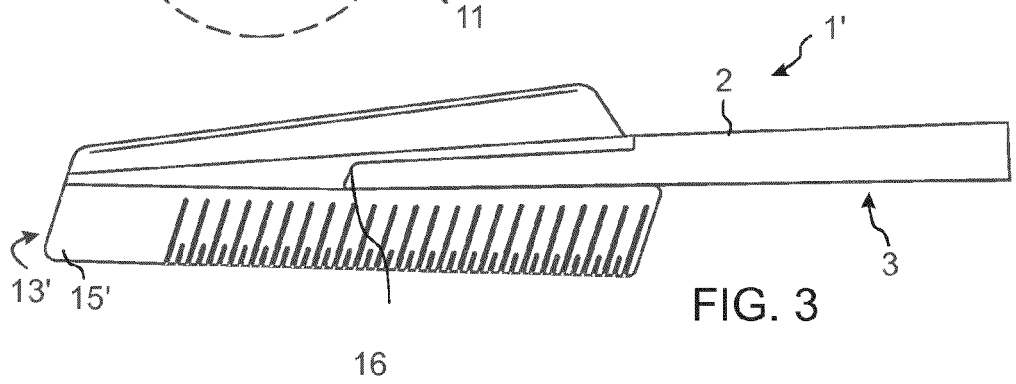
Figure 4:
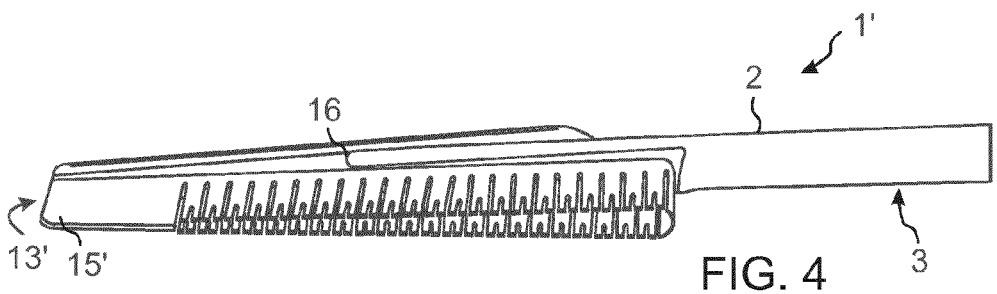

FIGS. 3 and 4 illustrate a second embodiment of a car snow brush. The car snow brush 1' of FIGS. 3 and 4 is very similar as the car snow brush 1 illustrated in FIGS. 1 and 2. Therefore the embodiment of FIGS. 3 and 4 will be mainly explained by pointing out the differences between these embodiments.

In FIGS. 3 and 4 the plate 15' which forms a part of the blade 13' is not provided with slits as in the embodiment of FIGS. 1 and 2. Therefore this plate 15' is even more stiff in order to make it even more easy to dig up snow from a grove or cavity, for instance.

Figure 5:
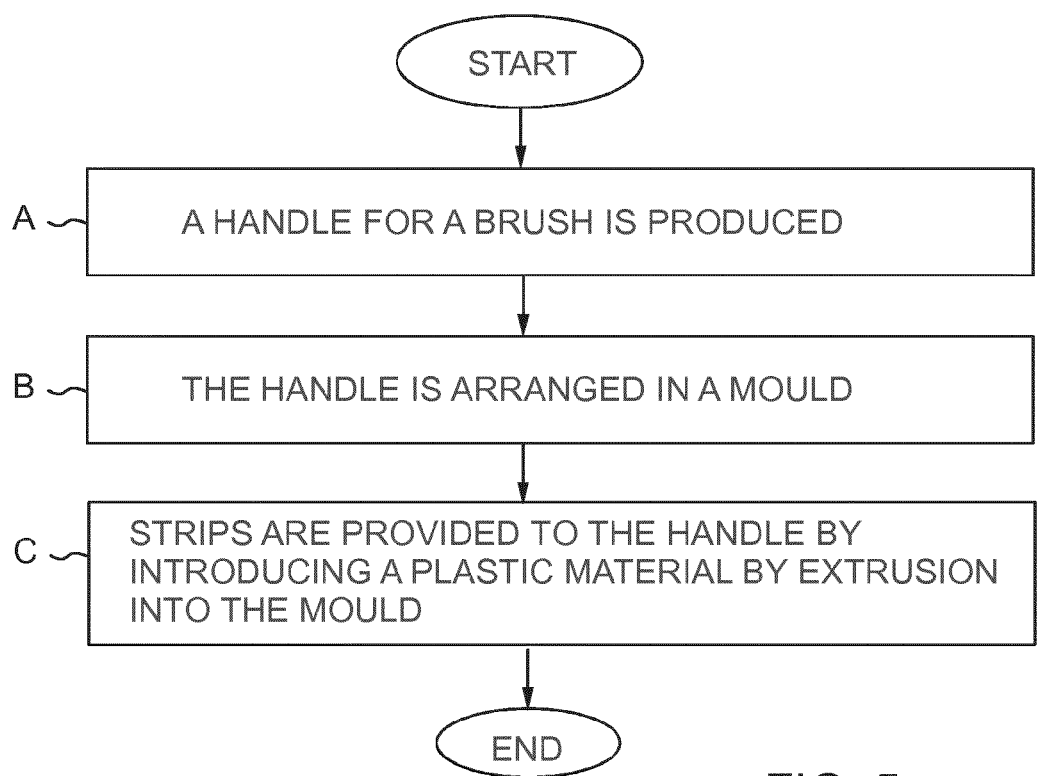
FIG. 5 is a block diagram illustrating manufacturing of a car snow brush.

FIG. 5 is a block diagram illustrating manufacturing of a car snow brush. The block diagram of FIG. 5 may be utilized for manufacturing a car snow brush as illustrated in FIGS. 1 to 4, for instance.

In block A an elongated handle 2 for a car snow brush is manufactured. This may be carried out in a first mould by plastic extrusion such that a hollow plastic handle is produced.

In block B the handle is removed from the first mould and at least a part of the elongated handle is arranged in a second mould. The second mould may be shaped to produce and attach at least the strips 4 to the handle 2. However, if a scraper 12 and a blade 13, 13' is also desired in the car snow brush, the second mould may be shaped to produce the strips 4, the blade 13, 13' and the scraper 12 as separate parts or as one single part.

In step C a plastic material is introduced into the second mould by plastic extrusion.

It is to be understood that the above description and the accompanying figures are only intended to illustrate the present invention. It will be obvious to a person skilled in the art that the invention can be varied and modified without departing from the scope of the invention.

The invention claimed is:

1. A car snow brush comprising:
an elongated handle with a gripping area, and
bristles protruding from the elongated handle, the bristles comprising elongated and flat strips, which are manufactured of a plastic material, and are arranged in at least two adjacent rows which protrude from the elongated handle with a gap between them such that inner larger side surfaces of the strips in a first row face inner larger side surfaces of the strips in a second row, and wherein
the at least two adjacent rows are separated from each other by the gap which is larger than the thickness of the strips.

2. The car snow brush according to claim 1, wherein the strips have larger side surfaces and smaller end surfaces, and the strips are aligned in at least one row such that the smaller end surfaces of the strips face smaller end surfaces of adjacent strips.

3. The car snow brush according to claim 1, wherein the at least two rows are arranged in a V configuration, where the gap between the rows is largest in vicinity of the gripping area.

4. The car snow brush according to claim 1, wherein an outermost tip of the car snow brush which is located as far away from the gripping area as possible comprises a blade which is larger than the strips.

5. The car snow brush according to claim 1, wherein
the strips protrude from the car snow brush in a first direction, and the car snow brush comprises a scraper protruding from the elongated car snow brush in a second direction which is generally opposite to said first direction.

6. The car snow brush according to claim 5, wherein the blade has an outer edge facing away from the gripping area, and the length of an outer edge of the scraper is longer than the length the outer edge of the blade.

7. The car snow brush according to claim 5, wherein
the blade, the scraper and the strips are manufactured as one single part, and
an end of the elongated handle is attached to the one single part comprising the blade, the scraper and the strips.

8. A method for manufacturing a car snow brush, comprising:
producing an elongated handle with a gripping area;
arranging at least a part of the elongated handle in a mould;
introducing a plastic material into the mould in order to produce one single part comprising at least bristles having elongated and flat strips and a cavity into which an end of the elongated handle protrudes in order to attach the elongated handle to the one single part.

9. A method according to claim 8, wherein the mould is provided with a mould cavity for producing one single part comprising said flat strips protruding in a first direction from the car snow brush, a scraper protruding from the car snow brush in a second direction which is opposite to said first direction, and a blade at an outermost tip of the car snow brush which is located as far away from the gripping area as possible.

* * * * *